J. R. MOFFITT.
Grain Separator.
No. 540. Reissued March 23, 1858.
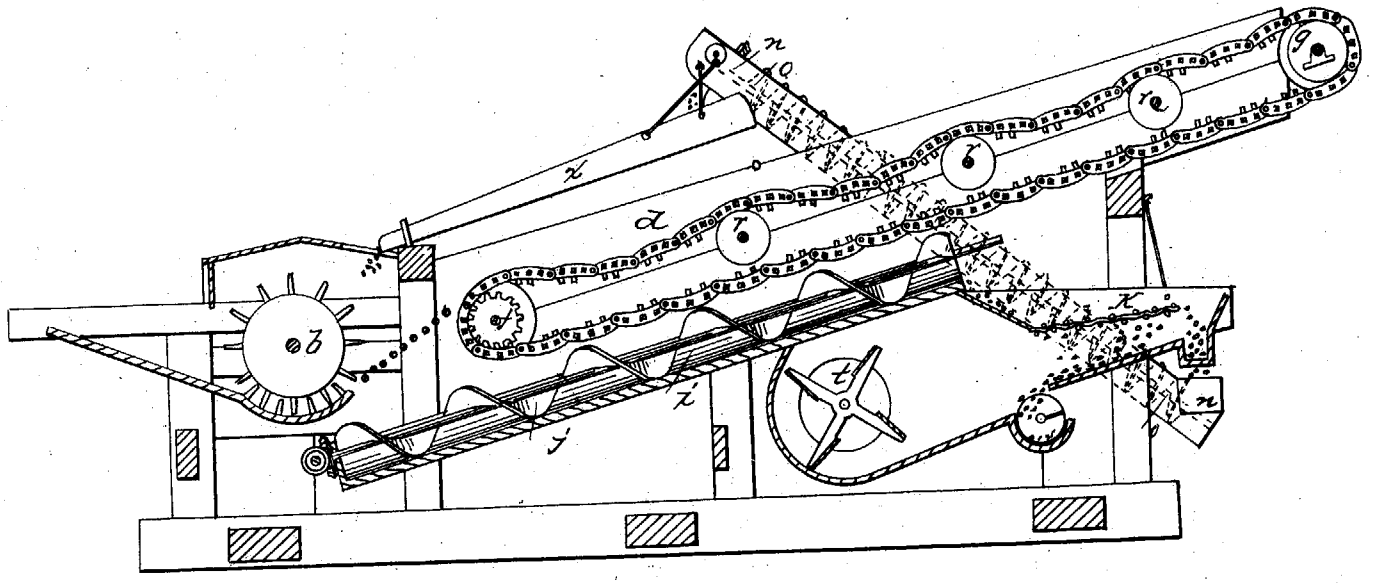
N. PETERS, Photo-Lithographer, Washington, D. C.

UNITED STATES PATENT OFFICE.

JOHN R. MOFFITT, OF ST. LOUIS, MISSOURI.

IMPROVEMENT IN GRAIN-SEPARATORS.

Specification forming part of Letters Patent No. 9,432, dated November 30, 1852; Reissue No. 540, dated March 23, 1858.

*To all whom it may concern:*

Be it known that I, JOHN R. MOFFITT, of St. Louis, St. Louis county, Missouri, have invented new and useful Improvements in Grain-Separators; and I hereby declare the following to be a full and exact description of the same, reference being had to the accompanying drawing, making part of this specification.

The first part of my invention consists in an improved construction of endless-chain straw-carrier, the links of which are furnished with protuberances or cavities, which, in connection with suitable driving-pinions, are the means of imparting positive motion to the straw carrier for the purpose of enabling it to run slack and loose, to increase its efficiency, at the same time that it is rendered much more durable and the power required to propel it greatly reduced.

The second part of the invention consists of an improved apparatus for returning the "tailings" to the thrashing-cylinder.

The accompanying drawing represents a vertical longitudinal section of a machine embodying my improvements.

The toothed thrashing-cylinder *b*, concave *c*, riddle *k*, and fan *t* may be of any suitable form.

The straw-carrier is composed of endless chains *d*, connected by wooden slats or rods about three-fourths of an inch in diameter and from an inch to an inch and a half apart. The links of the chains *d* are provided with teeth *s*, or depressions, which engage with suitable driving-pinions, *f*, for the purpose of imparting to the straw-carrier a positive motion without the necessity of its being tightly stretched, the objects of which are hereinafter explained.

*g* are loose pulleys carrying one end of the straw-carrier, and adjustable in distance from the pinions *f*. *r r* are rollers supporting the upper side of the straw-carrier and assisting its agitation.

*j* is a spiral conveyer employed to forward to the winnowing apparatus all matters which fall through the straw-carrier into the trough *i*. *l* is a trough in which the imperfectly-thrashed heads, &c., are deposited by the combined action of the riddles *k*, fan *t*, and tail-board *u*. *o* is an elevator composed of a spiral flange having a pitch of about fifteen degrees, and mounted on a shaft journaled within the elevator-box *n*, which is set at an angle of somewhat less than forty-five degrees to the horizon, and in such position as to receive matters deposited in the trough *l* and return them to the thrashing cylinder by means of trough *x* or otherwise. The elevator-box *n* has a round bottom, and extends to a sufficient height above the upper side of the screw to prevent choking.

The operation is as follows: After passing through the thrashing apparatus *b c* the grain, chaff, &c., are by the tremulous shaking of the open straw-carrier rapidly separated from the straw, the latter passing over the tail of the machine, while the former fall through into troughs *i*, and are by screws *j* conveyed to the winnowing apparatus, where the grain, chaff, and "tailings" (or imperfectly-thrashed heads, &c.) are separated in customary manner, and the latter, being deposited in the elevator-box *n*, are by the spiral elevator *o* returned in a continuous stream to the action of the thrashing-cylinder.

It is evident that the construction of the chains *d* will admit of various slight modifications without changing their leading characteristics or the essential features of the invention. For instance, the cogs on the driving-pinions may engage in depressions in the links, or the pinions may be furnished with cavities for the reception of protuberances on the links.

The importance of this part of the invention consists in enabling the straw-carrier to run slack and loose by propelling it by a positive and definite motion, rather than by the traction of smooth pulleys, the advantages of which are, first, the avoidance of friction, whereby the power required to propel the carrier is reduced and its durability increased many fold; and, second, increasing the tremulous shaking motion, which is best adapted for the separation of grain from straw. The straw-carrier is thus found to be such an effectual separator as to entirely avoid the waste of grain by passing over the tail of the machine, and at the same time to allow the thrashing apparatus to be constructed and arranged with exclusive reference to easy and effectual thrashing, which greatly economizes power and increases the efficiency of the machine.

It is preferable to drive the straw carrier by its lower end, the slackness of the upper side being by this means increased.

Some provision is indispensably necessary to return the imperfectly-thrashed heads, &c., regularly and continuously to the thrashing apparatus, and the described spiral or screw elevator is believed to be the only effectual apparatus ever contrived for that purpose. The common elevator composed of buckets on an endless belt has been applied to this purpose, but is found inoperative when the grain is damp, or when the amount of tailings is large or is accompanied with straw, weeds, &c., which it is impossible entirely to separate therefrom. Under these circumstances the bucket-elevator will invariably choke, whereas a screw-elevator constructed as described, and of moderate pitch, carries back to the thrashing-cylinder, without trouble or fail, everything which can come within its reach.

I claim as new and of my invention herein—

1. The endless chains *d*, composed of metallic links provided with protuberances or depressions, when used in combination with suitable driving pinions to impart a positive motion to the straw-carrier of a thrashing and separating machine, as explained.

2. In combination with a receptacle in which the tailings are deposited by the winnowing apparatus, the arrangement of the screw-elevator *o*, in relation to the thrashing-cylinder, for the purpose of returning the tailings to be rethrashed, as set forth.

In testimony of which invention I hereunto set my hand.

J. R. MOFFITT.

Witnesses:
OCT. KNIGHT,
JOHN S. HOLLINGSHEAD.